(12) United States Patent
Knittel et al.

(10) Patent No.: US 8,199,628 B2
(45) Date of Patent: Jun. 12, 2012

(54) MULTILAYER COAXIAL HOLOGRAPHIC STORAGE SYSTEM

(75) Inventors: Joachim Knittel, Tuttlingen (DE); Heiko Trautner, Unterkirnach (DE)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 13/138,540

(22) PCT Filed: Feb. 25, 2010

(86) PCT No.: PCT/EP2010/052419
§ 371 (c)(1),
(2), (4) Date: Sep. 1, 2011

(87) PCT Pub. No.: WO2010/102907
PCT Pub. Date: Sep. 16, 2010

(65) Prior Publication Data
US 2011/0317537 A1    Dec. 29, 2011

(30) Foreign Application Priority Data

Mar. 11, 2009    (EP) .................................. 09305225

(51) Int. Cl.
*G11B 7/00* (2006.01)
(52) U.S. Cl. .................................. 369/103; 369/112.24
(58) Field of Classification Search .................... None
See application file for complete search history.

(56) References Cited

U.S. PATENT DOCUMENTS

| 6,147,782 | A  | 11/2000 | Daiber et al. |
| 2005/0030875 | A1 | 2/2005 | Horimai |
| 2006/0171006 | A1 | 8/2006 | Fukumoto et al. |
| 2007/0253042 | A1 | 11/2007 | Szarvas et al. |
| 2007/0258118 | A1 | 11/2007 | Toishi et al. |
| 2008/0239924 | A1 | 10/2008 | Fujita et al. |

FOREIGN PATENT DOCUMENTS

| EP | 1515320 | 3/2005 |
| EP | 1986187 | 10/2008 |
| JP | 2007-193874 | 8/2007 |

OTHER PUBLICATIONS

SearchRept:May 5, 2009-Apr. 14, 2010.

*Primary Examiner* — Paul Huber
(74) *Attorney, Agent, or Firm* — Robert D. Shedd; Patricia Verlangieri

(57) ABSTRACT

An apparatus for reading from a multilayer holographic storage medium with a coaxial arrangement of a reference beam and a reconstructed object beam is described. The apparatus has an objective lens for focusing the reference beam into the multilayer holographic storage medium such that the reference beam has a focal point behind or in front of a reflective layer of the multilayer holographic storage medium, wherein a distance between the objective lens and the multilayer holographic storage medium is set in accordance with an addressed layer of the multilayer holographic storage medium, and an imaging system with a fixed lens of focal length f and a movable lens of focal length f for re-collimating a reconstructed object beam, wherein for a specific position of the movable lens the imaging system assumes a 4$f$ configuration. For re-collimating the reconstructed object beam the apparatus is adapted to shift the movable lens of the 4$f$ imaging system by substantially twice the shift of the objective lens necessary for addressing a specific layer of the multilayer holographic storage medium.

8 Claims, 2 Drawing Sheets

MULTILAYER COAXIAL HOLOGRAPHIC STORAGE SYSTEM

Figure 1:
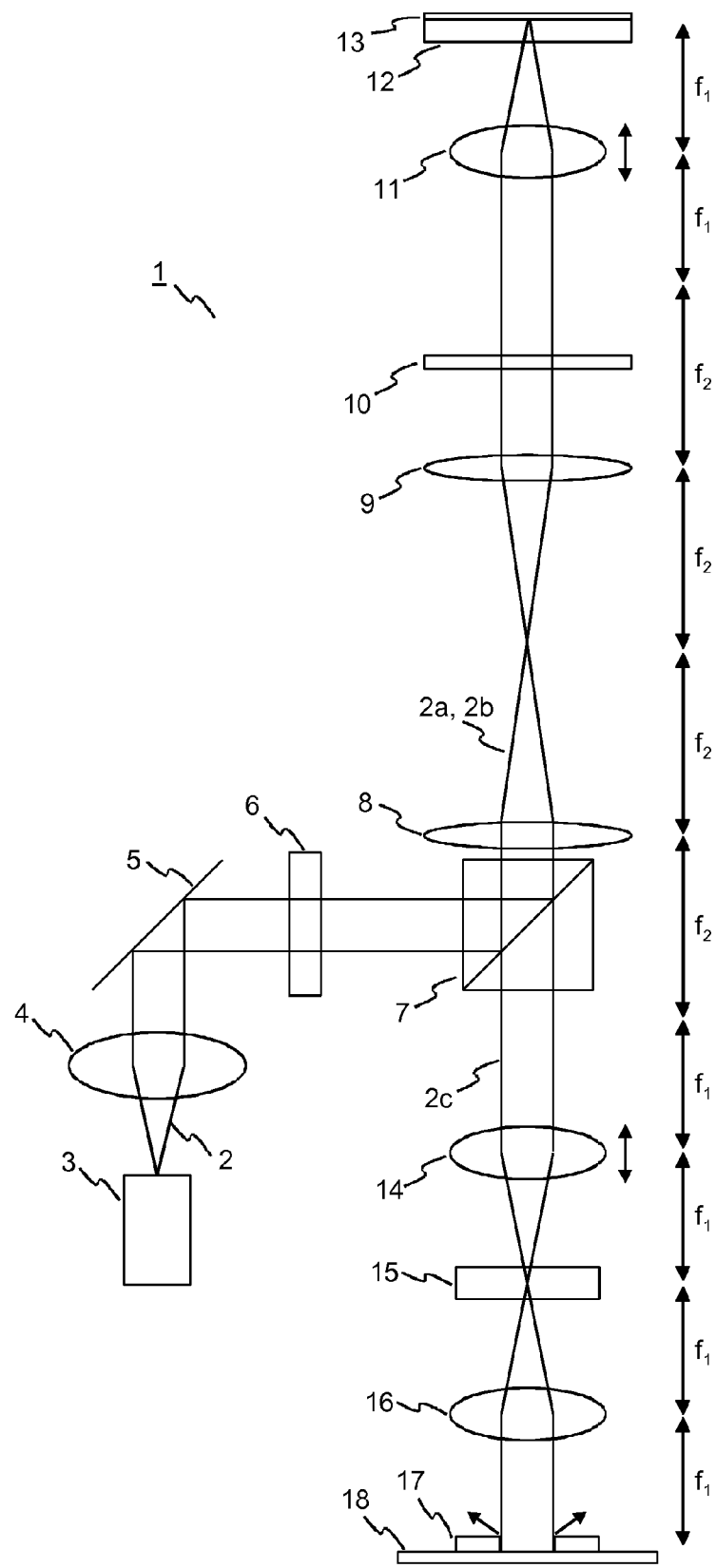

This application claims the benefit, under 35 U.S.C. §365 of International Application PCT/EP2010/052419, filed Feb. 25, 2010, which was published in accordance with PCT Article 21(2) on Sep. 16, 2010 in English and which claims the benefit of European patent application No. 09305225.6, filed Mar 11, 2009.

The present invention relates to a coaxial holographic storage system, i.e. an apparatus for reading from and/or writing to a holographic storage medium with a coaxial arrangement of a reference beam and an object beam or a reconstructed object beam. The apparatus is capable of reading from and/or writing to a multilayer holographic storage medium.

In holographic data storage digital data are stored by recording the interference pattern produced by the superposition of two coherent laser beams, where one beam, the so-called 'object beam', is modulated by a spatial light modulator and carries the information to be recorded. The second beam serves as a reference beam. The interference pattern leads to modifications of specific properties of the storage material, which depend on the local intensity of the interference pattern. Reading of a recorded hologram is performed by illuminating the hologram with the reference beam using the same conditions as during recording. This results in the reconstruction of the recorded object beam.

One advantage of holographic data storage is an increased data capacity. Contrary to conventional optical storage media, the volume of the holographic storage medium is used for storing information, not just a few layers. One further advantage of holographic data storage is the possibility to store multiple data in the same volume, e.g. by changing the angle between the two beams or by using shift multiplexing, etc. Furthermore, instead of storing single bits, data are stored as data pages. Typically a data page consists of a matrix of light-dark-patterns, i.e. a two dimensional binary array or an array of grey values, which code multiple bits. This allows to achieve increased data rates in addition to the increased storage density. The data page is imprinted onto the object beam by the spatial light modulator (SLM) and detected with a detector array. Straightforward examples of an SLM are an amplitude SLM, where the pixels with the value '0' block the light, and the pixels with the value '1' transmit or reflect it, and a phase SLM, where the information bits '0' and '1' (or vice versa) are expressed by a phase shift of '0' and 'π', respectively.

In K. Tanaka et al.: "*Improved performance in coaxial holographic data recording*", Opt. Exp. 15 (2007), pp. 16196-16209 a coaxial holographic storage system is disclosed. Coaxial holographic storage systems are attractive, because they can be made compact, have a simple optical setup and are compatible with conventional optical disc systems. However, the storage capacity of such systems is limited, as the usable volume of the holographic storage material is limited to a thickness of about 300 μm from the reflective layer of the holographic storage medium. The reference beam and the object beam do not overlap significantly beyond a distance of about 300 μm from the focus for a typical numerical aperture of 0.65. Thus a thicker holographic storage layer does not improve the capacity.

In this regard US 2007/0253042 A1 discloses a coaxial holographic storage system for use with a multilayer transmission-type and reflection-type holographic storage medium. In case of reflection-type media, the reference beams are focused in front of the reflective layer. Though this system allows for an increased capacity, for addressing a specific layer of the holographic storage medium a reading lens system and a writing lens system need to be moved perpendicularly to the storage medium. As a consequence the optical system of this coaxial holographic storage system is rather complex.

U.S. Pat. No. 6,147,782 discloses a holographic storage system for transmission-type holographic storage media. An optical head is provided with a reflective surface, onto which the reference beam is focused.

US 2008/0239924 A1 discloses a holographic storage system for reflection-type multilayer holographic storage media. The reference beam is focused in front of a reflective layer of the holographic storage medium.

It is an object of the invention to propose an apparatus for reading from and/or writing to a multilayer holographic storage medium with a coaxial arrangement of a reference beam and an object beam or a reconstructed object beam, which has a simplified optical setup.

According to the invention, this object is achieved by an apparatus for reading from and/or writing to a multilayer holographic storage medium, with a coaxial arrangement of a reference beam and an object beam or a reconstructed object beam, which has:
  an objective lens for focusing the reference beam into the multilayer holographic storage medium such that the reference beam has a focal point behind or in front of a reflective layer of the multilayer holographic storage medium; and
  a 4f imaging system with a movable lens for re-collimating a reconstructed object beam;
wherein for re-collimating the reconstructed object beam the apparatus is adapted to shift the movable lens of the 4f imaging system by substantially twice the shift of the objective lens necessary for addressing a specific layer of the multilayer holographic storage medium Similarly, a method for reading from and/or writing to a multilayer holographic storage medium, with a coaxial arrangement of a reference beam and an object beam or a reconstructed object beam has the steps of:
  focusing the reference beam beyond or in front of a reflective layer of the multilayer holographic storage medium with an objective lens; and
  re-collimating a reconstructed object beam with a 4f imaging system with a movable lens, wherein the movable lens is shifted by substantially twice the shift of the objective lens necessary for addressing a specific layer of the multilayer holographic storage medium.

While many known coaxial holographic storage systems for multilayer holographic storage media are based on transmission type holographic storage media, the apparatus according to the invention uses a reflection type holographic storage medium. Such media have the advantage that the optical system is relatively simple, as all optical components are arranged on one side of the holographic storage medium. However, while it is rather easy to address a specific storage layer of a transmission type holographic storage medium, this is more difficult for a reflection type holographic storage medium. For a transmission type holographic storage medium it is sufficient to simply move the whole optical system, or at least a focusing lens for focusing the reference beam into the holographic storage medium and a collimating lens for collimating a reconstructed object beam, relative to the holographic storage medium. This is not possible for a reflection type holographic storage medium. To overcome this problem, the reference beam is focused by an objective lens beyond or before the reflective layer of the holographic storage medium. To address a specific storage layer, the position of the focus is shifted along the optical axis relative to the reflective layer. As a consequence the reconstructed object beam is not fully collimated by the objective lens and shows a certain spherical aberration. Therefore, an adjustable optical system is provided that ensures a sharp image of the reconstructed object beam on the array detector. Of course, when the reference beam is focused beyond the reflective layer, this means that the focal point is only reached after reflection at the reflective layer. In other words, the virtual focal point of the reference beam is located behind the reflective layer.

A 4f imaging system with a movable lens is provided for re-collimating a reconstructed object beam. By re-collimating the reconstructed object beam it becomes possible to use a normal array detector for detecting the reconstructed object beam. This reduces the cost of the optical system. A Fourier filter for filtering the reconstructed object beam is favorably arranged in the joint focal plane of the 4f imaging system. In this way noise is easily filtered from the reconstructed object beam.

For re-collimating the reconstructed object beam the movable lens of the 4f imaging system is shifted by substantially twice the shift of the objective lens necessary for addressing a specific layer of the multilayer holographic storage medium. For this purpose the movable lens of the 4f imaging system has essentially the same focal length as the objective lens. This has the advantage that the position of the movable lens necessary for re-collimating the reconstructed object beam can be determined from the position of the objective lens in a simple manner. Furthermore, the symmetrical optical setup is ideal for compensating optical aberrations.

Favorably, the 4f imaging system further includes a transparent plate for compensating for spherical aberrations caused by the multilayer holographic storage medium. The optical path length of the reconstructed object beam inside the holographic storage medium depends on the addressed storage layer. This leads to spherical aberrations of the reconstructed object beam, which are compensated by the transparent plate. This leads to a reduced error rate. The transparent plate is adapted to the multilayer holographic storage medium. The transparent plate favourably has twice the optical path length of a cover layer of the multilayer holographic storage medium. For example, in case the transparent plate has the same refractive index as the cover layer, the thickness of the transparent plate is twice the thickness of the cover layer.

Advantageously, a variable aperture is arranged before an array detector for blocking a reflected reference beam. The variable aperture preferably is an electronically controlled aperture, which changes its size as a function of the position of the movable lens of the 4f imaging system. The re-collimation system consisting of the 4f imaging system and the transparent plate causes a slight change of the diameter of the reconstructed object beam as a function of the position of the movable lens. This is taken this into account by the variable aperture, which blocks the reference beam reflected by the reflective layer. In this way the reflected reference beam does not impinge on the array detector.

Figure 2:
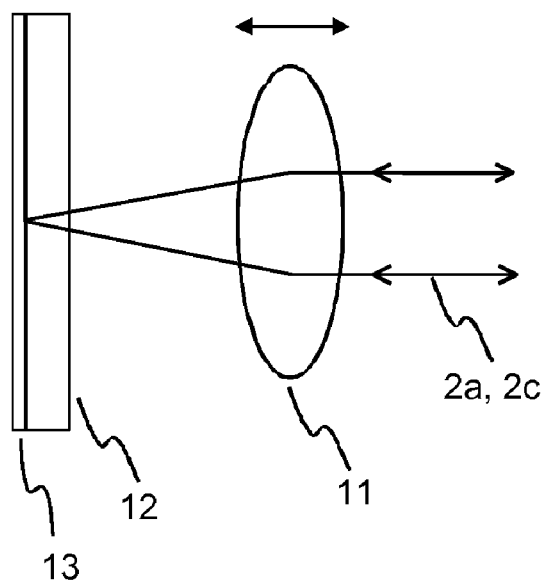
Figure 3:
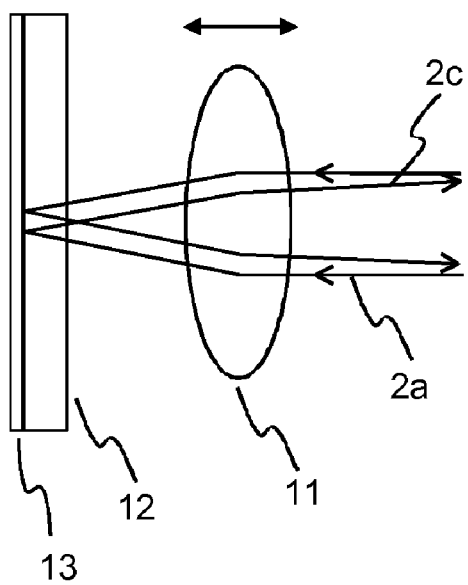

For a better understanding the invention shall now be explained in more detail in the following description with reference to the figures. It is understood that the invention is not limited to this exemplary embodiment and that specified features can also expediently be combined and/or modified without departing from the scope of the present invention as defined by the appended claims. In the figures:

FIG. 1 schematically depicts a coaxial holographic storage system according to the invention, FIG. 2 illustrates retrieval of a hologram from a conventional holographic storage medium, and FIG. 3 depicts retrieval of a hologram from a multilayer holographic storage medium.

FIG. 1 schematically depicts a coaxial holographic storage system 1 according to the invention. A light beam 2 emitted by laser 3 and collimated by a lens 4 is reflected by a mirror 5 towards a transmissive spatial light modulator 6. The transmissive spatial light modulator 6 is used for modulating the light beam 2 for generating a reference beam 2a and an object beam 2b or only the reference beam 2a. Of course, it is likewise possible to use a reflective spatial light modulator. In addition, a binary phase plate (not shown) for spreading the intensity distribution and improving the interference efficiency between the object beam 2b and the reference beam 2a is preferably integrated in the spatial light modulator 6. A polarizing beam splitter 7 deflects the modulated light beam towards a 4f-imaging system consisting of two lenses 8, 9 each having a focal length $f_2$. The modulated light beam then passes a quarter-wave plate 10 and is focused into a multilayer holographic storage medium 12 by an objective lens 11.

For writing holograms to different layers of the multilayer holographic storage medium 12, the distance between the objective lens 11 and the multilayer holographic storage medium 12 is adapted. However, no further modification of the optical system is necessary for writing.

For readout only the reference beam 2a is generated by the spatial light modulator 6. The distance between the objective lens 11 and the multilayer holographic storage medium 12 is set in accordance with the addressed layer.

In the conventional case, which is illustrated in FIG. 2, where the reference beam 2a is focused onto a reflective layer 13 of the multilayer holographic storage medium 12, the returning reconstructed object beam 2c is collimated by the objective lens 11. As the polarization is rotated by the quarter-wave plate 10, the reconstructed object beam 2c is transmitted through the polarizing beam splitter 7 and impinges on an array detector 18 after passing through two further lenses 14, 16, which form a 4f imaging system. Preferentially the two further lenses 14, 16 are identical to the objective lens 11 and have a focal length $f_1$. Located between the two further lenses 14, 16 is a transparent plate 15. This transparent plate 15 is used to compensate for spherical aberrations, which arise because the objective lens 11 has to compensate for the layer thickness of the multilayer holographic storage medium 12. To achieve this the optical path length of the transparent plate 15 is twice the optical path length of a cover layer of the multilayer holographic storage medium 12.

If the hologram has been recorded in a different layer, as illustrated in FIG. 3, the objective lens 11 is moved to the corresponding position. In this case the returning reconstructed object beam 2c is a diverging beam and needs to be re-collimated by the optical system. This is achieved by moving the first lens 14 of the two further lenses 14, 16 forming the 4f imaging system. If the objective lens 11 is moved by dx towards the multilayer holographic storage medium 12, the distance between the first lens 14 and the second lens 16 of the two further lenses 14, 16 is increased by approximately 2×dx, and vice versa. Though the compensation is not 100%, the diameter of the reconstructed object beam 2c on the array detector 18 remains almost constant.

Due to the proposed re-collimation system consisting of the two further lenses 14, 16 and the transparent plate 15, the diameter of the reconstructed object beam 2c changes slightly as a function of the position of the first further lens 14. To take this into account a variable aperture 17 is located in front of the array detector 18 to block the reflected reference beam 2a.

Advantageously, an electronically controlled aperture 17 is used, which changes its size as a function of the position of the first further lens 14.

The invention claimed is:

1. An apparatus for reading from a multilayer holographic storage medium, with a coaxial arrangement of a reference beam and a reconstructed object beam, the apparatus comprising:
    an objective lens for focusing the reference beam into the multilayer holographic storage medium such that the reference beam has a focal point behind or in front of a reflective layer of the multilayer holographic storage medium; wherein a distance between the objective lens and the multilayer holographic storage medium is set in accordance with an addressed layer of the multilayer holographic storage medium; and
    an imaging system with a fixed lens of focal length f and a movable lens of focal length f for re-collimating a reconstructed object beam wherein for a specific position of the movable lens the imaging system assumes a 4f configuration;
    wherein for re-collimating the reconstructed object beam the apparatus is adapted to shift the movable lens of the 4f imaging system by substantially twice the shift of the objective lens necessary for addressing a specific layer of the multilayer holographic storage medium.

2. The apparatus according to claim 1, wherein the imaging system further comprises a transparent plate for compensating for spherical aberrations caused by the multilayer holographic storage medium.

3. The apparatus according to claim 2, wherein the transparent plate has twice the optical path length of a cover layer of the multilayer holographic storage medium.

4. The apparatus according to claim 1, comprising a variable aperture arranged before an array detector for blocking a reflected reference beam.

5. The apparatus according to claim 4, wherein the variable aperture is an electronically controlled aperture, which is adapted to change its size as a function of the position of the movable lens of the imaging system.

6. A method for reading from multilayer holographic storage medium, with a coaxial arrangement of a reference beam and a reconstructed object beam, the method comprising the steps of:
    focusing the reference beam beyond or in front of a reflective layer of the multilayer holographic storage medium with an objective lens; wherein a distance between the objective lens and the multilayer holographic storage medium is set in accordance with an addressed layer of the multilayer holographic storage medium; and
    re-collimating a reconstructed object beam with an imaging system with a fixed lens of focal length f and a movable lens of focal length f, wherein for a specific position of the movable lens the imaging system assumes a 4f configuration, and wherein the movable lens is shifted by substantially twice the shift of the objective lens necessary for addressing a specific layer of the multilayer holographic storage medium.

7. The method according to claim 6, further comprising the step of blocking a reflected reference beam with a variable aperture arranged before an array detector.

8. The method according to claim 7, wherein the size of the variable aperture (17) is changed as a function of the position of the movable lens of the imaging system.

* * * * *